United States Patent [19]

Grosser et al.

[11] Patent Number: 4,577,944
[45] Date of Patent: Mar. 25, 1986

[54] LENS MOUNT WITH NOISE REDUCING MEANS

[75] Inventors: Siegfried Grosser, Heidenheim; Christian Ludwig, Oberkochen; Kurt Wallner, Eching/Dietersheim; Karl Herzog, Taufkirchen; Eugen Bayerl, Kirchheim, all of Fed. Rep. of Germany

[73] Assignee: Carl-Zeiss-Stiftung, Heidenheim on the Brenz, Fed. Rep. of Germany

[21] Appl. No.: 675,507

[22] Filed: Nov. 28, 1984

[51] Int. Cl.⁴ .............................................. G03B 31/00
[52] U.S. Cl. ...................................................... 352/35
[58] Field of Search ........................................... 352/35

[56]  References Cited
U.S. PATENT DOCUMENTS 1,221,407  4/1917  Amet ...................................... 352/35
4,013,352  3/1977  Monroy ................................. 352/35

Primary Examiner—Monroe H. Hayes
Attorney, Agent, or Firm—Stonebraker, Shepard & Stephens

[57] ABSTRACT

A lens mount, especially but not exclusively for use with motion picture cameras, with special means for preventing transmission of noise through the lens mount from operation of moving parts within the camera to a microphone located in front of the camera. A focusing lens mount has two mounting parts which are movable axially relative to each other, and with a small clearance space between these two parts. An annular groove is provided, extending circumferentially around a cylindrical portion of one of these mounting parts. In this groove is a sound damping or impeding element, resiliently pressed against a companion cylindrical surface on the other of the mounting parts, to block passage of sound through the clearance space between the two cylindrical parts. The sound damping element is made of material having good dry-sliding characteristics.

10 Claims, 4 Drawing Figures

LENS MOUNT WITH NOISE REDUCING MEANS

This invention relates to a lens mount intended especially but not exclusively for use on motion picture cameras used for making sound motion pictures, where there is a sound pick-up device arranged in front of the lens.

When sound is to be recorded simultaneously with the taking of a motion picture, it is important to avoid recording the sounds made by the operation of the camera. High quality sound recording requires optimal damping of all sounds produced in the camera housing. Modern camera construction has greatly improved the situation, so much so that when a microphone is arranged at the side of the camera, it no longer picks up disturbing noises. However, there are times when it is desired to have the microphone in front of the lens of the camera, rather than at the side of the camera, and when this is done, it is found that disturbing noises are still picked up by the microphone.

Study indicates that this is probably due to the emergence of noise from the front of the camera housing through the lens assembly. The lens or objective assembly must have movable parts in order to permit focusing movements, and it is believed that the disturbing sounds emerge at least partly if not largely through the necessary clearance spaces which are provided in order to insure free and easy focusing movements. Typically the objective assembly includes a tubular part in fixed relation to the camera housing, which may or may not contain one or more lens components, and another tubular part which does contain one or more lens components and is slidable relative to the first tubular part, for focusing. The clearance provided between these tubular parts seems to furnish a path for travel of sounds from within the camera body or housing, out to a microphone arranged in front of the objective.

The object of the invention is to provide a lens mount which blocks the travel of sound produced within the camera out through the mount, to a sufficient extent that disturbing camera sounds are not picked up by a microphone in front of the lens, and which does this in a way which does not adversely affect the ease of focusing the lens.

This object is achieved by providing an annular groove in one of the lens mounting parts, and by inserting in this groove a member having good dry-sliding properties which rests with radial resiliency throughout its entire circumference against a surface on the other lens mounting part, to prevent passage of sound through the clearance space or gap between the two parts of the mount. By selecting a material having good dry-sliding properties for this sound-sealing member or element, an effective sound-insulating construction is provided which does not appreciably increase the force required to perform the focusing movements, as compared with a similar lens which does not have this sound-sealing construction.

Some particularly advantageous constructions for this purpose are described below.

The construction in accordance with the invention is so simple that it may be applied even to existing lens mounts, without great trouble or expense.

In case a particularly high degree of sound damping is required, two or more grooves with sound insulating strips in them may be provided at different points along the length of the lens mount.

BRIEF DESCRIPTION OF THE DRAWINGS

The invention will be explained in further detail in connection with the accompanying drawings, in which.

DETAILED DESCRIPTION

Figure 1:
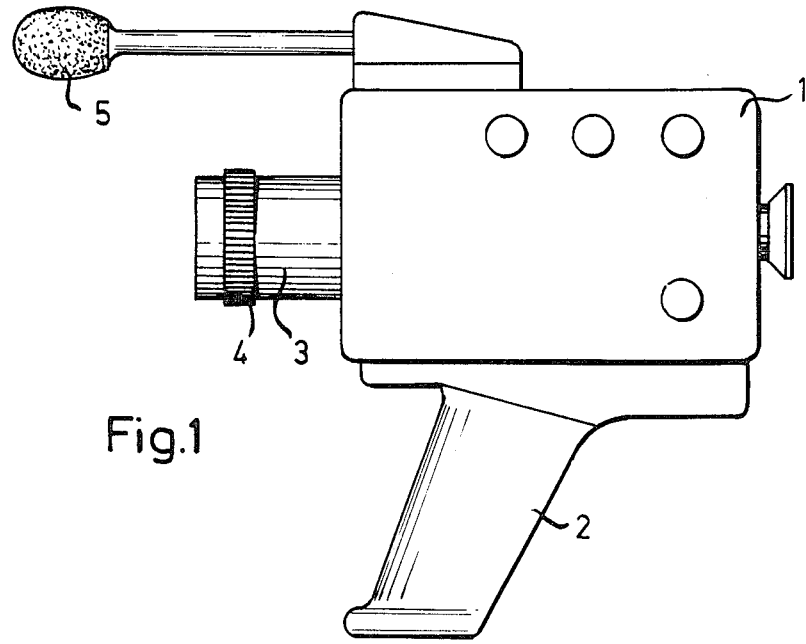
FIG. 1 is a side elevational view of a motion picture camera with an attached microphone arranged in front of the lens, illustrating a typical arrangement with which the present invention is useful.

In FIG. 1 there is shown a motion picture camera having a main body portion or housing 1, a handle 2 (usually but not necessarily pivoted to the body), and an objective or lens within a mount 3, which may be either permanently mounted on the front of the camera body, or be detachable and interchangeable in known manner. The rotary ring 4 is rotatable for focusing the lens. A microphone 5 is positioned in front of the lens, and is electrically connected in known detachable manner to the camera. It may also be mechanically connected, being mounted as here shown on an arm or bracket fastened to the camera body, or it may be separately mounted independently of the camera. The manner of mounting the microphone is unimportant so far as the present invention is concerned, and the microphone may be in any position relative to the camera without affecting the invention, but as above stated the invention has its greatest usefulness when the microphone is in front of the lens, because it is when the microphone is in this position that it is most sensitive to picking up unwanted sounds produced by operation of the moving parts within the camera body during the picture-taking operation.

The lens mount has a stationary outer barrel or tube 6 on which the focusing ring 4 rotates. A pin fixed to the ring 4 projects inwardly through a slot 7 in the outer barrel, and engages a spiral groove 8 formed in an inner barrel or tube 9 which can slide longitudinally in the outer barrel but is prevented from turning therein by a pin 11 on the inner barrel engaging a longitudinal groove 12 in the outer barrel. Thus when the focusing ring 4 is turned, the inner barrel 9 is moved axially in the direction of the arrow 14 with respect to the outer barrel 6, to shift the axial position of one or more lens components mounted in the inner barrel, as indicated schematically at 13, relative to the conventional focal plane or film plane (not shown) within the camera body.

This is simply a typical known form of focusing lens mount, here disclosed as background for the present invention. The exact details of the focusing arrangement are not important so far as the present invention is concerned, and may be widely altered without departing from the invention.

According to the invention, an annular groove 15 is cut into the outer barrel or first mounting part 6. A slit plastic strip 16 is placed in this groove, extending around the entire length of this groove, i.e., around the entire circumference of the inner barrel or second mounting part 9. Upon focusing movement of the barrel 9, the strip 16 slides in sealing fashion on the smooth cylindrical surface 17 of the the barrel 9.

The strip 16 should fit snugly across the width of the groove 15, i.e., in the direction of the optical axis. Also it should press radially inwardly against the surface 17 of the barrel 9, with radial resiliency throughout the entire circumference of the barrel 9. In the embodiment shown in FIGS. 2 and 3, this radial resiliency or radial inward pressure is provided by employing a silicone tube 18, laid in the bottom of the groove 15 and extending all the way around the groove, before the sealing member or sound damping member 16 is inserted in the groove. The dimensions are such that the silicone tube must be somewhat compressed or flattened, as illustrated in FIG. 3, in order to accommodate the thickness of the sealing strip 16 between the tube 18 and the surface 17 of the barrel 9. The natural resiliency of the silicone tube 18, always tending to resume its circular cross sectional shape instead of its slightly flattened shape, produces the desired resilient constant radial inward pressure of the strip 16 against the surface 17.

The plastic sealing strip 16 is formed of a material having good dry-sliding properties. Excellent materials for this purpose are the materials available on the commercial market under the trademarks "Teflon" and "Rulon." These materials have such good sliding properties (such low coefficient of friction) that the force to be applied to the focusig ring in order to focus a lens equipped with this invention is not measurably increased relative to the forced required when the lens does not have the sealing arrangement of the invention.

Figure 2:
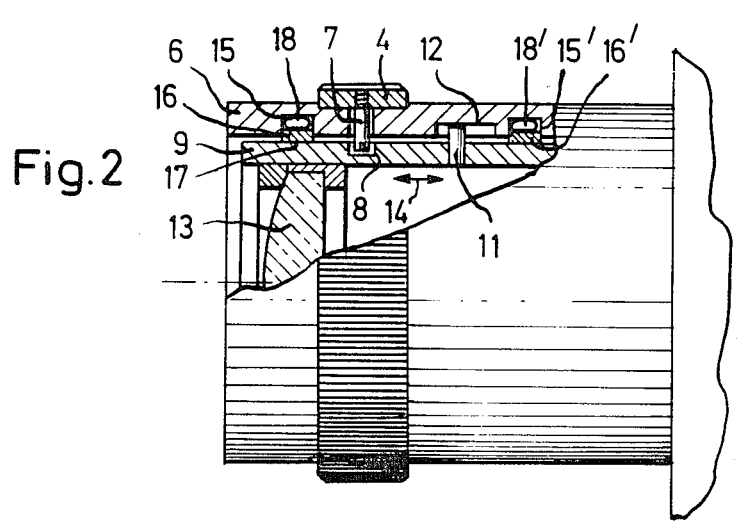
FIG. 2 is a fragmentary side elevational view of a lens mount in accordance with a preferred embodiment of the invention, with parts broken away and parts in vertical section.
Figure 3:
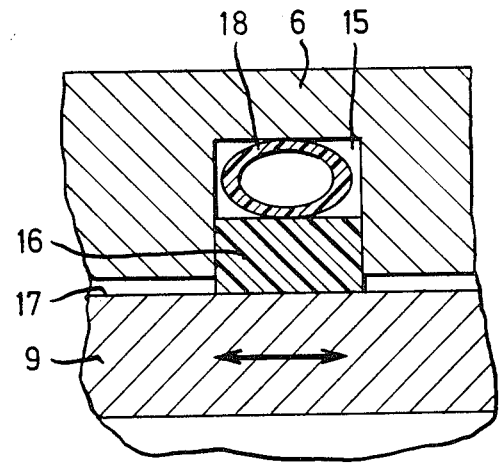
FIG. 3 is a vertical section corresponding to a portion of FIG. 2, on a larger scale.
Figure 4:
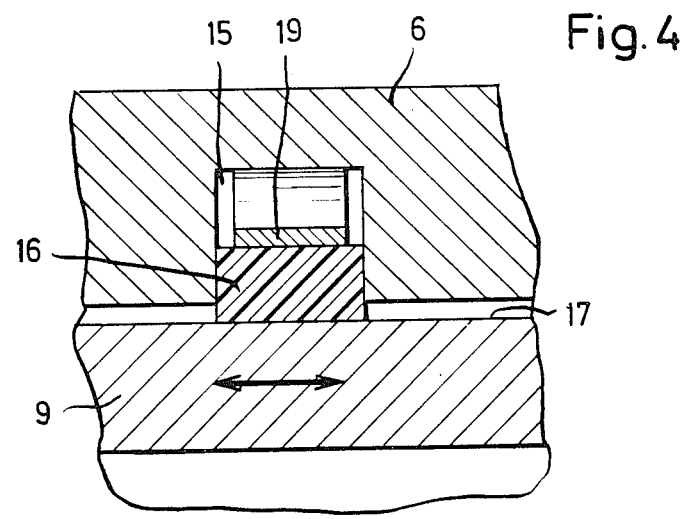
FIG. 4 is a view similar to FIG. 3, illustrating a modification.

Instead of using a silicone tube 18 to exert the radial pressure on the sealing ring 16, as in FIGS. 2 and 3, one may use a leaf spring 19 as shown in FIG. 4. Other radially resilient elements are also possible. In each case, the parts should be designed so that the sealing strip 16 rests with uniform resiliency throughout its entire circumference against the cylindrical surface 17 of the mounting part 9.

If a lens mount is to be developed in such a manner that even an unusually sensitive or extremely sensitive microphone can be used in front of the lens without picking up any noise originating in the camera, then it may be desirable to provide a plurality of resilient sealing elements, spaced axially from each other, instead of only one. Such an arrangement is shown in FIG. 2, where there is a second groove 15' containing a second sealing strip 16' resiliently pressed radially inwardly against the cylindrical periphery of the lens tube 9 by the silicone tube 18'. These parts operate like the respective parts 15, 16, 18 previously described. Three or more such grooves and sealing strips may be used if desired for situations of greater noise originating in the camera or greater sensitivity of the microphone.

It is equally possible, of course, to reverse the arrangement, forming the groove in the outer surface of the inner lens barrel 9, and pressing the sealing strip radially outwardly against the smooth cylindrical inner surface of the outer barrel 6.

It is believed that the effectiveness of the present invention is due mainly or perhaps entirely to the effect of the sealing strip 16 (or strips 16, 16', etc., if more than one is used) in blocking passage of sound through the clearance space between the relatively movable outer and inner lens mounting parts 6 and 9, respectively. However, it is possible that part of the effectiveness may be due to the pressure of the damping parts 16 and 18 against the metal parts 6 and 9, which may tend to decrease vibration which would transmit sound through the metal parts themselves, as distinguished from transmission of sound through air in the clearance space between the metal parts.

What is claimed is:

1. A camera lens mount having provision for impeding transmission of sound from within a camera through the mount to a point in front of the camera, comprising a first mounting part attached to a camera, a second mounting part movable with respect to the first mounting part for focusing, said second part carrying at least one optical component, a groove formed in one of said mounting parts in a direction transverse to the direction of movement of said second mounting part relative to said first mounting part, and a sound damping element of material having good dry-sliding properties seated in said groove and resiliently engaging the other of said mounting parts to impede transmission of sound in an axial direction along said lens mount.

2. The invention defined in claim 1, wherein said first and second mounting parts have respective portions with cylindrical surfaces in the vicinity of said groove, and said groove and sound damping element therein extend completely around the circumference of one of said cylindrical surfaces, and wherein said groove has a rectangular cross section, and an element which is resilient in a radial direction with respect to said cylindrical surfaces lies in the bottom of said groove and presses said sound damping element resiliently against said cylindrical surface of the mounting part other than the one in which said groove is formed.

3. The invention defined in claim 2, wherein said sound damping element is made of "Rulon."

4. The invention defined in claim 2, wherein said resilient element is a silicone tube.

5. The invention defined in claim 2, wherein said resilient element is a leaf spring.

6. The invention defined in claim 2, wherein said sound damping element is made of "Teflon."

7. The invention defined in claim 1, wherein there is a plurality of grooves in one of said mounting parts, each of said grooves containing a sound damping element resiliently engaging the other of said mounting parts.

8. A focusing lens mount comprising a first tubular mounting part adapted to be attached to a camera, said first part having a cylindrical inner surface throughout part of its length, a second tubular mounting part carrying an optical element and movable axially at least partly within said first part for focusing, said second part having a cylindrical outer surface located at least partly opposite said cylindrical inner surface of said first part, a groove extending circumferentially completely around the entire circumference of one of said cylindrical surfaces, an element having good dry-sliding properties mounted in said groove and extending around the entire circumferential extent of said groove, and means pressing said element resiliently against the other of said cylindrical surfaces throughout substantially the complete circumference thereof.

9. The invention defined in claim 8, wherein said pressing means is a silicone tube located in said groove under said element and slightly compressed in a direction radially with respect to said cylindrical surfaces, said silicone tube having resilience tending to return to a circular cross section and thereby resiliently pressing said element in a direction outwardly of said groove.

10. The method of reducing transmission of noise through a focusing lens mount from operating parts within a camera to a microphone located in front of the camera, which comprises the steps of:
  (a) providing a lens mount having two portions axially movable relative to each other for focusing, said two portions having respective inner and outer cylindrical surfaces one within the other and with a clearance space between them;
  (b) forming in one of said cylindrical surfaces an annular groove extending around the entire circumference of the surface in which it is formed;
  (c) placing in said groove a sound damping element extending throughout the entire circumferential length of said groove and dimensioned to project radially outwardly from the groove into slidable contact with the other of said cylindrical surfaces; and
  (d) placing resilient means in the bottom of said groove prior to placing said sound damping element therein, to tend to displace said sound damping element radially out of said groove to keep it resiliently engaged with the other one of said cylindrical surfaces;
  (e) whereby said sound damping element will impede passage of sound through said clearance space between said two cylindrical surfaces and thereby reduce pick-up by a microphone in front of the camera of any noises produced by operating parts within the camera.

* * * * *

UNITED STATES PATENT AND TRADEMARK OFFICE
CERTIFICATE OF CORRECTION

PATENT NO. : 4,577,944

DATED : March 25, 1986

INVENTOR(S) : Siegfried Grosser, Christian Ludwig, Kurt Wallner, Karl Herzog, and Eugen Bayerl It is certified that error appears in the above-identified patent and that said Letters Patent is hereby corrected as shown below:

In the heading of the patent, add the following:

[30] Foreign Application Priority Data

Dec. 2, 1983  [DE]  Fed. Rep. of Germany          G 8334641

Signed and Sealed this

Eighth Day of July 1986

[SEAL]

Attest:

Attesting Officer

DONALD J. QUIGG

Commissioner of Patents and Trademarks